United States Patent
Shiho et al.

(10) Patent No.: US 6,992,123 B2
(45) Date of Patent: Jan. 31, 2006

(54) POLISHING PAD

(75) Inventors: Hiroshi Shiho, Tokyo (JP); Hiromi Aoi, Tokyo (JP); Kou Hasegawa, Tokyo (JP); Nobuo Kawahashi, Tokyo (JP)

(73) Assignee: JSR Corporation, Tokyo (JP)

( * ) Notice: Subject to any disclaimer, the term of this patent is extended or adjusted under 35 U.S.C. 154(b) by 107 days.

(21) Appl. No.: 10/700,554

(22) Filed: Nov. 5, 2003

(65) Prior Publication Data
US 2004/0118051 A1 Jun. 24, 2004

(30) Foreign Application Priority Data
Nov. 5, 2002 (JP) ............................ 2002-321856

(51) Int. Cl.
*C08L 1/00* (2006.01)
*C08L 1/26* (2006.01)
*C08L 3/00* (2006.01)
*C08L 5/00* (2006.01)
*C08L 89/00* (2006.01)

(52) U.S. Cl. ............................ 524/17; 524/27; 524/35; 524/37; 524/43; 524/46; 524/47; 524/48; 524/492

(58) Field of Classification Search ................. 524/27, 524/17, 35, 37, 43, 46, 47, 48, 492
See application file for complete search history.

(56) References Cited

U.S. PATENT DOCUMENTS

| | | | |
|---|---|---|---|
| 5,250,085 A * | 10/1993 | Mevissen ...................... | 51/298 |
| 5,900,164 A | 5/1999 | Budinger et al. | |
| 5,976,000 A | 11/1999 | Hudson | |
| 6,390,890 B1 * | 5/2002 | Molnar ........................ | 451/41 |
| 6,435,958 B1 | 8/2002 | Damgaard et al. | |
| 2002/0098790 A1 | 7/2002 | Burke | |

FOREIGN PATENT DOCUMENTS

| | | | |
|---|---|---|---|
| EP | 1 164 559 | | 12/2001 |
| EP | 1164559 A1 | * | 12/2001 |
| EP | 1 201 368 | | 5/2002 |
| EP | 1201368 A2 | * | 5/2002 |
| EP | 1 252 973 | | 10/2002 |
| EP | 1252973 A1 | * | 10/2002 |
| JP | 8-500622 | | 1/1996 |
| JP | 2000-33552 | | 2/2000 |
| JP | 2000-34416 | | 2/2000 |
| JP | 2001-334455 | | 12/2001 |
| WO | WO 94/04599 | * | 3/1994 |

OTHER PUBLICATIONS

U.S. Appl. No. 10/529,742, filed Mar. 29, 2005, Shiho et al.
U.S. Appl. No. 10/829,936, filed Apr. 23, 2004, Shiho et al.
U.S. Appl. No. 10/449,196, filed Jun. 2, 2003, Kawahashi et al.
Patent Abstracts of Japan, JP 2001-047355, Feb. 20, 2001.

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

A polishing pad of the present invention contains a water-insoluble matrix material comprising a crosslinked polymer such as a crosslinked 1,2-polybutadiene and water-soluble particles dispersed in the material, such as saccharides. The solubility of the water-soluble particles in water is 0.1 to 10 wt % at 25° C., and the amount of water-soluble particles eluted from the pad when the pad is immersed in water is 0.05 to 50 wt % at 25° C. Further, in the polishing pad of the present invention, the solubility of the water-soluble particles in water is 0.1 to 10 wt % at 25° C. at a pH of 3 to 11, and solubility thereof in water at 25° C. at a pH of 3 to 11 is within ±50% of solubility thereof in water at 25° C. at a pH of 7. In addition, the water-soluble particles contain an amino group, an epoxy group, an isocyanurate group, and the like. This polishing pad has good slurry retainability even if using slurries different in pH and also has excellent polishing properties such as a polishing rate and planarity.

31 Claims, 1 Drawing Sheet

POLISHING PAD

BACKGROUND OF THE INVENTION

1. Field of the Invention

The present invention relates to a polishing pad. More specifically, it relates to a polishing pad which has good slurry retainability, a high degree of hardness, and excellent polishing properties such as a capability of forming a polished surface with sufficient planarity.

The polishing pad of the present invention is widely used for polishing the surfaces of semiconductor wafers and other materials.

2. Description of the Prior Art

As a polishing method capable of forming a polished surface with a high degree of planarity, CMP (Chemical Mechanical Polishing) has been drawing attention in recent years. In CMP, a surface to be polished is polished by sliding or rotating a polishing pad and the surface against each other with a slurry which is a water-based dispersion having abrasives dispersed therein caused to flow down on the surface of the polishing pad.

One of factors which significantly affect productivity in this CMP is a polishing rate. This polishing rate can be significantly improved by increasing the amount of a retained slurry from a conventional amount.

In CMP, heretofore, a polyurethane foam containing fine air bubbles is used as the polishing pad, and polishing is carried out with a slurry retained in pores opened on a surface of this polishing pad.

However, it is difficult to control the degree of foaming in the polyurethane foam to a desired degree, and it is very difficult to control the sizes of the air bubbles, a foaming density and other properties uniformly throughout the foam. Consequently, the quality of the polishing pad comprising the polyurethane foam varies, thereby causing a variation in the polishing rate and other properties.

JP-A 8-500622, JP-A 2000-34416 and JP-A 2000-33552 (the term "JP-A" as used herein means an "unexamined published Japanese patent application") disclose various resins having water-soluble materials dispersed therein as polishing pads whose pores can be controlled more easily than the above polishing pad comprising the foam. Of these publications, the former two publications describe the effectiveness of a polishing pad containing a water-soluble material. Further, in the last publication, a material of a matrix material is studied, and a polishing pad for which more stable polishing and an improvement in polishing rate are recognized is disclosed. However, the slurry retainability and polishing rate of the polishing pad are not necessarily satisfactory.

Furthermore, slurries having different pHs in a wide range of pHs have heretofore been used, and a polishing pad capable of adapting to these various slurries different in pH has been desired.

SUMMARY OF THE INVENTION

The present invention has been conceived in view of the above circumstances.

An object of the present invention is to provide a polishing pad which shows a high polishing rate since it is excellent in slurry retainability over a wide pH range even if various slurries having different pHs are used; has a high degree of hardness; can form a polished surface having sufficient planarity; and can effectively prevent deterioration in the slurry retainability and polishing rate during polishing and after dressing.

Other objects and advantages of the present invention will be apparent from the following description.

The present inventors have intensively studied a mechanism of gradual deterioration in slurry retainability and polishing rate during polishing and a mechanism of formation of pores on the surface of a polishing pad by use of a diamond whetstone (surface conditioning) or formation of pores in dressing which reconditions the surface of the polishing pad. As a result, it has been found that when shearing stress is exerted on the surface of a conventional polishing pad by the above polishing and dressing, a matrix material which is a main constituent of the pad undergoes elongation, followed by plastic deformation, whereby pores are blocked. Further, it has also been found that the pores are blocked by not only polishing dust from a polished surface but also polishing dust from the matrix material itself. That is, it has been revealed that these causes make it difficult to maintain a polishing rate. As a method of solving them, use of a material having a crosslinked structure which exhibits an elasticity restoration property as the matrix material is effective. More stable polishing has been desired, and further improvements in slurry retainability and polishing rate have also been desired. The present invention has been completed based on these findings and desires.

That is, according to the present invention, firstly, the above object and advantages of the present invention are achieved by a polishing pad which comprises a water-insoluble matrix material comprising a crosslinked polymer and water-soluble particles dispersed in the water-insoluble matrix material, wherein the solubility of the water-soluble particles in water is. 0.1 to 10 wt % at 25° C., and the amount of water-soluble particles eluted from the pad when the pad is immersed in water is 0.05 to 50 wt % at 25° C.

Further, according to the present invention, secondly, the above object and advantages of the present invention are achieved by a polishing pad which comprises a water-insoluble matrix material comprising a crosslinked polymer and water-soluble particles dispersed in the water-insoluble matrix material, wherein the solubility of the water-soluble particles in water is 0.1 to 10 wt % at 25° C. at a pH of 3 to 11, and solubility thereof in water at 25° C. at a pH of 3 to 11 is within ±50% of solubility thereof in water at 25° C. at a pH of 7.

Further, according to the present invention, thirdly, the above object and advantages of the present invention are achieved by a polishing pad which comprises a water-insoluble matrix material comprising a crosslinked polymer and water-soluble particles dispersed in the water-insoluble matrix material, wherein the water-soluble particles contain at least one group selected from the group consisting of an amino group, an epoxy group, an isocyanurate group and a hydroxyl group.

DETAILED DESCRIPTION OF THE PREFERRED EMBODIMENTS

Figure 1:
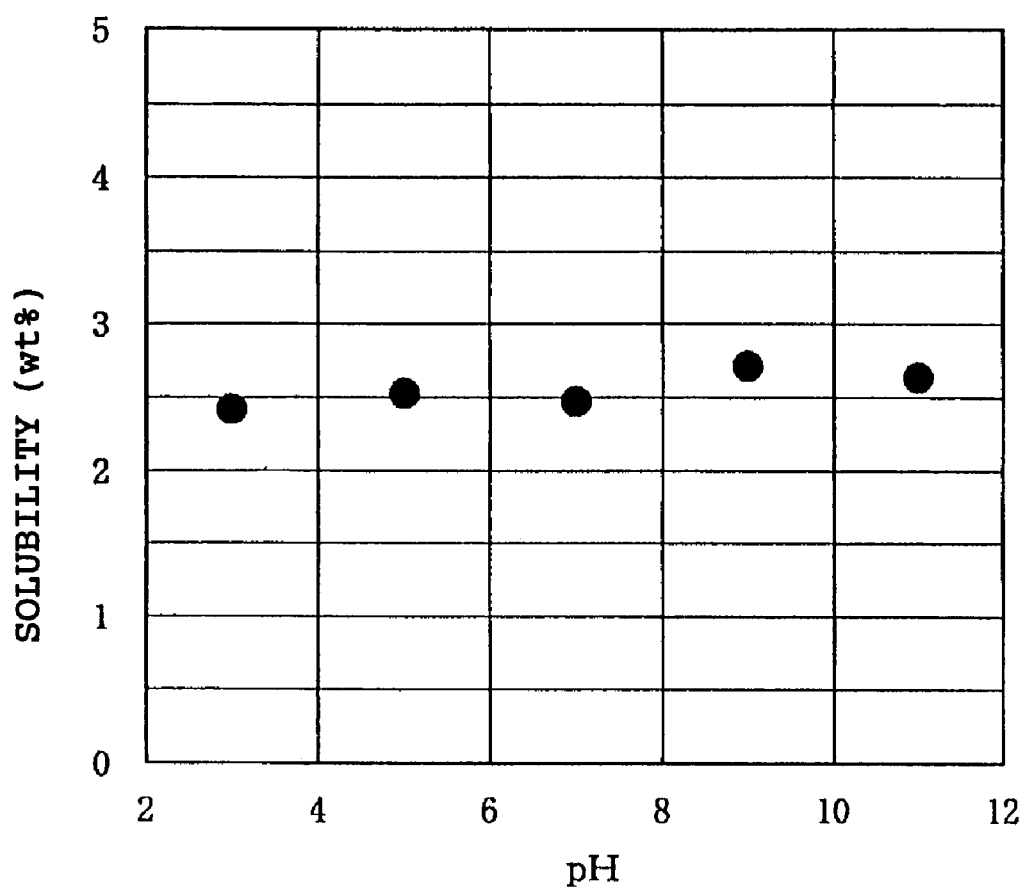
FIG. 1 is a graph showing that the water solubility at 25° C. of β-cyclodextrin coupled with γ-(2-aminoethyl)-aminopropyltrimethoxysilane is hardly changed by pH.

Hereinafter, the present invention will be described in detail.

The above "water-insoluble matrix material" (hereinafter may also be simply referred to as "matrix material") contains a crosslinked polymer.

The above "crosslinked polymer" constitutes the matrix material and imparts an elasticity restoration property to the matrix material by having a crosslinked structure. By containing the crosslinked polymer, displacement caused by shearing stress exerted on a polishing pad during polishing can be kept small, and it can be effectively inhibited that the matrix material is drawn excessively and undergoes plastic deformation during polishing and dressing, thereby blocking pores, and that the surface of the polishing pad becomes too fuzzy. Therefore, pores can be formed efficiently, deterioration in slurry retainability at the time of polishing is little, fuzz hardly occurs, and inhibition of polishing planarity is avoided.

Illustrative examples of such a crosslinked polymer include a crosslinked polymer resulting from crosslinking an uncrosslinked polymer such as a thermoplastic resin, an elastomer, a crude rubber or a curable resin, i.e., a resin curable by heat or light such as a thermosetting resin or photocurable resin, and a crosslinked polymer resulting from co-crosslinking a mixture of at least two of the above uncrosslinked polymers. Further, crosslinking may be performed on a portion or the whole of the polymer. Further, in the former crosslinking, a mixture comprising a partially crosslinked polymer and an uncrosslinked polymer or a mixture comprising a wholly crosslinked polymer and an uncrosslinked polymer may be produced. A method of carrying out the crosslinking may be chemical crosslinking by use of a crosslinking agent or radiation crosslinking through irradiation of ultraviolet radiation or an electron beam.

As a crosslinking method, chemical crosslinking using a crosslinking agent is preferred. Illustrative examples of the crosslinking agent include sulfur and an organic peroxide. For polishing a semiconductor, the organic peroxide is preferred since impurities such as sulfur are detrimental to the semiconductor. Specific examples of the organic peroxide include dicumyl peroxide, di-t-butyl peroxide, diethyl peroxide, diacetyl peroxide and diacyl peroxide. They may be used alone or in admixture of two or more. These crosslinking agents are preferably used in an amount of not larger than 5 wt %, more preferably 0.01 to 4 wt %, particularly preferably 0.1 to 3 wt %, based on a crosslinkable (co)polymer.

At this point, a polymer crosslinked in advance may be mixed, and a crosslinking reaction may be carried out in the co-presence of such a crosslinking agent as described above in a step to be described later of mixing a water-insoluble matrix with water-soluble particles.

Specific examples of the thermoplastic resin include a 1,2-polybutadiene resin; an ethylene-vinyl acetate copolymer such as EVA containing 3 wt % or more of vinyl acetate units; polyolefin resins such as a polyethylene; an acrylonitrile-styrene-butadiene copolymer such as an ABS resin; a polystyrene resin; a polyacryl resin such as a (meth)acrylate resin; vinyl ester resins other than EVA; a saturated polyester resin; a polyamide resin; a fluororesin such as a polyvinylidene fluoride; a polycarbonate resin; and a polyacetal resin.

Specific examples of the elastomer include polyolefin-based elastomers (excluding EVA); styrene-based elastomers such as a styrene-butadiene-styrene copolymer and a hydrogenated block copolymer (SEBS) thereof; thermoplastic-polyurethane-based elastomers; thermoplastic-polyester-based elastomers; polyamide-based elastomers; silicone-resin-based elastomers; and fluorocarbon-resin-based elastomers.

Specific examples of the rubber include butadiene-based rubbers such as a high cis-butadiene rubber and a low cis-butadiene rubber; conjugated-diene-based rubbers such as an isoprene-based rubber, a styrene-butadiene-based rubber and a styrene-isoprene-based rubber; nitrile-based rubbers such as an acrylonitrile-butadiene-based rubber; acrylic rubbers; ethylene-α-olefin-based rubbers such as an ethylene-propylene-based rubber and an ethylene-propylene-diene-based rubber; and other rubbers such as a butyl rubber, a silicone rubber and a fluorine rubber.

Specific examples of the curable resin include an urethane resin, an epoxy resin, a (meth)acrylic resin, an unsaturated polyester resin, a polyurethane-urea resin, an urea resin, a silicon resin and a phenolic resin.

Of these crosslinked polymers, crosslinked polymers resulting from crosslinking of the 1,2-polybutadiene resin, ethylene-vinyl acetate copolymer, polyethylene resin, acrylonitrile-styrene-butadiene copolymer, styrene-butadiene-styrene copolymer, polyacryl resin, vinyl ester resin, saturated polyester resin, polyamide resin and polyacetal resin are preferred. In addition to these crosslinked polymers, crosslinked polymers resulting from co-crosslinking of two or more of these resins are also acceptable. These crosslinked polymers have a significant effect of improving moldability and abrasion resistance. Further, they hardly undergo softening caused by water absorption and are stable against acid and alkali contained in a slurry.

These crosslinked polymers may be contained in a matrix material alone or in combination of two or more.

Of these materials having a crosslink structure, a crosslinked 1,2-polybutadiene is preferred since it is stable against strong acid or strong alkali contained in various slurries for chemical machinery polishing and hardly undergoes softening caused by water absorption. The crosslinked 1,2-polybutadiene can be used solely or in admixture with otter materials. Preferred examples of the other materials which can be used in admixture with the crosslinked 1,2-polybutadiene include a butadiene rubber and an isoprene rubber. The content of the crosslinked 1,2-polybutadiene when it is used in the form of a mixture is preferably not lower than 30 wt %, particularly preferably not lower than 50 wt %.

Further, the matrix material may have a functional group such as an acid anhydride group, a carboxyl group, a hydroxyl group, an epoxy group or an amino group. By causing the matrix material to have such a functional group, the affinity of the matrix material for water-soluble particles and a slurry can be adjusted. When the water-soluble particles have a functional group such as an amino group, an epoxy group, an isocyanurate group or a hydroxyl group as will be described later, the matrix material containing a functional group and the water-soluble particles having a functional group are preferably not reacted to such an extent that a given amount of the water-soluble particles are eluted.

The matrix material preferably has an elongation which remains after fracture (hereinafter simply referred to as "residual elongation after fracture") of not higher than 100% according to JIS K6251 when a test piece comprising the matrix material is fractured at 80° C. In other words, a total gauge length after fracture is preferably at most twice or less as long as a gauge length before fracture. The residual elongation after fracture is preferably not higher than 30%, more preferably not higher than 10%, particularly preferably not higher than 5%. It is generally higher than 0%. When the residual elongation after fracture exceeds 100%, fine pieces scratched or stretched out of the surface of a polishing pad during polishing or restoration of the surface are liable to block pores undesirably.

The above "residual elongation after fracture" is an elongation resulting from subtracting a gauge length before a tensile test from the total of lengths from gauge lines to fractured points of fractured and divided test pieces when a dumbbell-shaped test piece No. 3 is fractured in the tensile test at a tensile rate of 500 mm/min and a testing temperature of 80° C. in accordance with a "tensile test method of vulcanized rubber" JIS K 6251. Further, the test is carried out at 80° C. since sliding or rotating causes heat in actual polishing.

Further, the water content of the matrix material is preferably not higher than 3%, more preferably not higher than 2%, particularly preferably not higher than 1%. When the water content is not higher than 3%, swelling of the water-soluble particles in the polishing pad is suppressed to a sufficient degree, thereby allowing the pad to have a high degree of hardness, and polishing properties such as in-plane uniformity and local planarity are improved. When the water content of the matrix material exceeds 3%, the water-soluble particles in the matrix material may be dissolved and/or swollen, and polishing properties such as in-plane uniformity and local planarity may be degraded undesirably.

The above water-soluble particles leave the matrix material when the polishing pad makes contact with water and/or a slurry which is a water-based dispersion at the time of polishing. Particularly, water-soluble particles present in the vicinity of the outermost layer of the polishing pad are eluted, whereby pores are formed. These pores serve to hold the slurry and hold polishing dust temporarily. The water-soluble particles dispersed in the matrix material not only dissolve and leave the matrix material upon contact with water but also may absorb water, swell and leave the matrix material in the form of a gel. Further, in addition to water, the water-soluble particles also dissolve or swell and leave the matrix material by contacting with a water-based mixed medium containing an alcohol-based solvent such as methanol.

The water-soluble particles may be organic or inorganic water-soluble particles. Of the two, the organic water-soluble particles having low solubility in water are generally preferred. Specific examples of the organic water-soluble particles include particles of saccharides (polysaccharides, e.g., α, β or γ-cyclodextrin, dextrin and starch, lactose, mannite, and the like), celluloses (hydroxypropyl cellulose, methylcellulose, and the like), proteins, a polyvinyl alcohol, a polyvinyl pyrrolidone, a polyacrylic acid, a polyacrylate, a polyethylene oxide, water-soluble photosensitive resins, a sulfonated polyisoprene, and a sulfonated polyisoprene copolymer. Of these, particles containing hydroxyl groups are particularly preferred. Further, as inorganic water-soluble particles which have low water solubility and can be used in the present invention, particles of calcium sulfate can be named, for example. In addition, particles of magnesium sulfate having higher solubility can also be used once the solubility which is lowered to a proper range by incorporating, for example, amino groups into the particles.

These water-soluble particles may be contained in the matrix material solely or in combination of two or more.

Further, the average particle diameter of these water-soluble particles is preferably 0.1 to 500 µm, more preferably 0.5 to 100 µm. When the average particle diameter is smaller than 0.1 µm, pores which are smaller in size than abrasives to be used are formed, so that it becomes liable to be difficult to obtain a polishing pad capable of holding a slurry satisfactorily. Meanwhile, when it is larger than 500 µm, the pores to be formed become so large that the mechanical strength and polishing rate of the polishing pad to be obtained are liable to deteriorate. Particle size distribution is not particularly limited, and particle diameters may be uniform or non-uniform. Further, the shapes of the water-soluble particles are not particularly limited. They may be in the form of plates, grains, spheres, spindles or needles or may be amorphous or may take any other forms.

The content of these water-soluble particles in the polishing pad is preferably 0.1 to 90 vol %, more preferably 1 to 60 vol %, particularly preferably 2 to 40 vol %, based on the total of the matrix material and the water-soluble particles which is 100 vol %. When the content of the water-soluble particles is lower than 0.1 vol %, pores are not formed sufficiently in the polishing pad to be obtained, so that the polishing rate is liable to drop. Meanwhile, when the content of the water-soluble particles is higher than 90 vol %, it is liable to become difficult to fully prevent swelling or dissolution of the water-soluble particles existing in the polishing pad to be obtained, and it becomes difficult to keep the hardness and mechanical strength of the polishing pad at proper values.

Further, to the water-soluble particles, an epoxy resin, a polyimide, a polyamide, a polysilicate or various coupling agents may be physically adsorbed or chemically bonded, for example. This is preferable since moisture absorption by the water-soluble particles is suppressed thereby. It is preferred that an outer shell be formed on at least a portion of the outermost portion of the water-soluble particle by the above material. In this case, moisture absorption by the water-soluble particles is further suppressed. Of the above materials, the coupling agents are more preferable, and of the coupling agents, a coupling agent having an amino group, an epoxy group or an isocyanurate group is particularly preferable.

Furthermore, the water-soluble particles can contain at least one functional group selected from the group consisting of an amino group, an epoxy group, an isocyanurate group and a hydroxyl group. In this case, the functional groups can serve as a compatibility-imparting agent and/or a dispersion stabilizer for the matrix material and the water-soluble particles, increase affinity between the matrix material and the water-soluble particles and improve dispersibility of the water-soluble particles in the matrix material. Thus, by improving the dispersibility of the water-soluble particles, a uniform polishing pad can be attained, and polishing properties such as in-plane uniformity and local planarity are improved.

As the functional group, the hydroxyl group is preferred as described above. When the matrix material has a functional group such as an acid anhydride group, a carboxyl group, a hydroxyl group, an epoxy group or an amino group as described above, the water-soluble particles having the functional group and the matrix material having the functional group are preferably not reacted to such an extent that a given amount of the water-soluble particles are eluted.

Illustrative examples of the coupling agent containing at least one group selected from an amino group, an epoxy group and an isocyanurate group include silane-based coupling agents, aluminum-based coupling agents, titanium-based coupling agents, and zirconia-based coupling agents. Of these, the silane-based coupling agents are often used. Of the silane-based coupling agents, an amino-group-containing silane-based coupling agent, an epoxy-group-containing silane-based coupling agent and an isocyanurate-group-containing silane-based coupling agent are more preferred.

Specific examples of the amino-group-containing silane-based coupling agent include aminopropyltrimethoxysilane, aminopropyltriethoxysilane, aminopropyl(methyl)dimethoxysilane, aminopropyl(methyl)diethoxysilane, N-phenyl-γ-aminopropyltrimethoxysilane, N-butyl-γ-aminopropyltrimethoxysilane, N-β-(aminoethyl)γ-aminopropyltrimethoxysilane, N-β(aminoethyl)γ-aminopropyl(methyl)dimethoxysilane, N-β(aminoethyl)γ-aminopropyltriethoxysilane, N-(6-aminohexyl)γ-aminopropyltrimethoxysilane, N-(6-aminohexyl)γ-aminopropyl(methyl)dimethoxysilane, N-(6-aminohexyl)γ-aminopropyltriethoxysilane, N-[styryl(aminomethyl)]γ-aminopropyltrimethoxysilane, N-[styryl(aminomethyl)]γ-aminopropyl(methyl)dimethoxysilane, N-[styryl(aminomethyl)]γ-aminopropyltriethoxysilane, N[N-β(aminoethyl)aminoethyl-γ-aminopropyltrimethoxysilane, N[N-β(aminoethyl)aminoethyl]γ-aminopropyl(methyl)dimethoxysilane, N[N-β(aminoethyl)aminoethyl]γ-aminopropyltriethoxysilane, N[N-(benzylmethyl)aminoethyl]γ-aminopropyltrimethoxysilane, N[N-(benzylmethyl)aminoethyl]γ-aminopropyl(methyl)dimethoxysilane, N[N-(benzylmethyl)aminoethyl]γ-aminopropyltriethoxysilane, N[N-(benzyl)aminoethyl]γ-aminopropyltrimethoxysilane, N[N-(benzyl)aminoethyl]γ-aminopropyl(methyl)dimethoxysilane, N[N-(benzyl)aminoethyl]γ-aminopropyltriethoxysilane, N-phenylaminopropyltrimethoxysilane, N-phenylaminopropyl(methyl)dimethoxysilane, N-phenylaminopropyltriethoxysilane, N-phenylaminomethyltrimethoxysilane, N-phenylaminomethyl(methyl)dimethoxysilane, N-phenylaminomethyltriethoxysilane, bis(trimethoxysilylpropyl)amine, P-[N-(2-aminoethyl)aminomethyl]phenethyltrimethoxysilane, N-[(3-trimethoxysilyl)propyl]diethylenetriamine, N-[(3-trimethoxysilyl)propyl]triethylentetramine, and N-3-trimethoxysilylpropyl-m-phenylenediamine.

Of these, aminopropyltrimethoxysilane, aminopropyltriethoxysilane, N-β-(aminoethyl)γ-aminopropyltrimethoxysilane, N-β(aminoethyl)γ-aminopropyl(methyl)dimethoxysilane and N-β(aminoethyl)γ-aminopropyltriethoxysilane are preferred.

Further, illustrative examples of the epoxy-group-containing silane-based coupling agent include γ-glycidoxypropyltrimethoxysilane, γ-glycidoxypropyl(methyl)dimethoxysilane, γ-glycidoxypropyltriethoxysilane, γ-glycidoxypropyl(methyl)diethoxysilane, and β-(3,4-epoxycyclohexyl)ethyltrimethoxysilane.

Of these, γ-glycidoxypropyltrimethoxysilane and γ-glycidoxypropyltriethoxysilane are preferred.

Further, illustrative examples of the isocyanurate-group-containing silane-based coupling agent include (trimethoxysilylpropyl)isocyanurate, (triethoxysilylpropyl)isocyanurate, (triisopropoxysilylpropyl)isocyanurate, 1,3-bis(trimethoxysilylpropyl)isocyanurate, 1,3-bis(triethoxysilylpropyl)isocyanurate, 1,3-bis(triisopropoxysilylpropyl)isocyanurate, 1,5-bis(trimethoxysilylpropyl)isocyanurate, 1,5-bis(triethoxysilylpropyl)isocyanurate, 1,5-bis(triisopropoxysilylpropyl)isocyanurate, 1,3,5-tris(trimethoxysilylpropyl)isocyanurate, 1,3,5-tris(triethoxysilylpropyl)isocyanurate, and 1,3,5-tris(triisopropoxysilylpropyl)isocyanurate.

Of these, 1,3,5-tris(trimethoxysilylpropyl)isocyanurate and 1,3,5-tris(triethoxysilylpropyl)isocyanurate are preferred.

Thes coupling agents may be used alone or in combination of two or more. Further, coupling agents containing different types of functional groups can be used in combination.

A treatment using the coupling agent containing at least one group selected from an amino group, an epoxy group and an isocyanurate group can be carried out by using the coupling agent in an amount of preferably not larger than 10 wt %, more preferably 0.01 to 10 wt %, much more preferably 0.01 to 5 wt %, based on the water-soluble particles. By the treatment using the coupling agent, the water-soluble particle contains at least one group selected from an amino group, an epoxy group and an isocyanurate group on the surface. Further, when the above outer shell is formed, the above effect can still be achieved sufficiently even if the outer shell is formed only on a portion of the water-soluble particle.

The solubility of the water-soluble particles in water (deionized water) at 25° C. is 0.1 to 10 wt %, preferably 0.2 to 8 wt %, more preferably 0.5 to 5 wt %. When the solubility is lower than 0.1 wt %, elution of the water-soluble particles at the time of polishing is insufficient, so that pores may not be able to be formed sufficiently and the polishing rate may be decreased. Meanwhile, when the solubility is higher than 10 wt %, the rate of elution to be described later of the water-soluble particles from the polishing pad may exceed an upper limit undesirably. When the solubility is within the above range, water-soluble particles present in the vicinity of the outermost layer of the polishing pad of the present invention dissolve or swell and leave or free from the polishing pad when the polishing pad of the present invention makes contact with slurries during polishing, thereby facilitating adequate formation of pores.

Further, when the water-soluble particles contain at least one group selected from an amino group, an epoxy group and an isocyanurate group, solubility thereof in water can be lowered and adjusted to a proper range more easily. Further, the solubility of the water-soluble particles in water at 25° C. at a pH of 3 to 11, preferably 1 to 13, is preferably 0.1 to 3 wt %, particularly preferably 0.5 to 2.5 wt %. When the solubility in water is low as described above, the degree of elution which will be described later can be adjusted to a preferred range easily, formation of pores inside the polishing pad can be prevented, the polishing pad can have sufficient hardness, and polishing properties such as in-plane uniformity and local planarity are improved.

The solubility of the water-soluble particles in water at a pH of 3 to 11, preferably 1 to 13, is solubility measured by use of water prepared by adding nitric acid or potassium hydroxide to deionized water and adjusting the pH of the solution. This definition applies to the following description as well.

Further, the solubility of the water-soluble particles in water at 50° C. is preferably 0.5 to 15 wt %, more preferably 0.7 to 12 wt %, particularly preferably 1 to 10 wt %. When the solubility is lower than 0.5 wt %, pores may not be able to be formed sufficiently and the polishing rate may be decreased as in the above case. Meanwhile, when the solubility is higher than 15 wt %, the rate of elution of the water-soluble particles from the polishing pad may exceed the upper limit undesirably as in the above case.

Further, the solubility of the above water-soluble particles in water at 25° C. at a pH of 3 to 11, preferably 1 to 13, is 0.1 to 10 wt % and is within ±50%, preferably ±30%, more preferably ±20% of solubility thereof in water at 25° C. at a pH of 7. In particular, the solubility of the water-soluble particles in water at 25° C. at a pH of 3 to 11, preferably 1 to 13, is 0.1 to 3 wt %, particularly 0.5 to 2.5 wt %, and is particularly preferably within ±50%, preferably ±30%, mor preferably ±20% of solubility thereof in water at 25° C. at a pH of 7. As long as a change in solubility by pH is within the above range, water-soluble particles present in the vicinity of the outermost layer of the polishing pad dissolve or swell and leave or free from the polishing pad, thereby facilitating adequate formation of pores, regardless of pH at the time of polishing and even if the pH changes during polishing.

Further, the elution rate of the water-soluble particles contained in the polishing pad when the polishing pad is immersed in water is preferably 0.05 to 50 wt %, more preferably 0.1 to 25 wt %, particularly preferably 0.2 to 10 wt %, at 25° C. Further, the elution rate is also preferably 0.05 to 50 wt %, more preferably 0.1 to 25 wt %, particularly preferably 0.2 to 10 wt %, at 50° C. When the elution rate is lower than 0.05 wt %, pores may not be formed sufficiently, and a desired polishing rate may not be exerted. Meanwhile, when it is higher than 50 wt %, pores may be formed even inside the polishing pad, the hardness of the polishing pad is lowered, and polishing properties such as in-plane uniformity and local planarity may deteriorate undesirably.

The rate of elution to water is preferably 0.05 to 50 wt %, more preferably 0.1 to 25 wt %, particularly preferably 0.2 to 10 wt %, at 25° C. or 50° C. at a pH of 3 to 11, preferably 2 to 13. As long as the elution rate is within a given range in the above pH range, excessive elution of the water-soluble particles can be inhibited, and only water-soluble particles present in the vicinity of the outermost layer of the polishing pad dissolve or swell and leave or free from the polishing pad, thereby facilitating adequate formation of pores, regardless of pH at the time of polishing and even if the pH changes during polishing. In addition, since deterioration in the hardness of the pad can also be inhibited, excellent polishing properties such as in-plane uniformity and local planarity are retained.

The rate of elution to water of the water-soluble particles at a pH of 3 to 11, preferably 1 to 13, is the rate of elution measured by use of water prepared by adding nitric acid or potassium hydroxide to deionized water and adjusting the pH of the resulting solution.

The rate of elution to water of the water-soluble particles can be calculated as a value obtained by dividing the weight of water-soluble particles eluted into water when the polishing pad is immersed in water (deionized water) whose weight is twice as much as that of the pad at 25° C. for 12 hours, by the weight of water-soluble particles contained in the polishing pad before immersion and then multiplying the quotient by 100.

In addition to the function of forming the pores, the water-soluble particles have a function of increasing the indentation hardness of the polishing pad (e.g., Shore D hardness of 35 to 100). With high indentation hardness, pressure applied to a surface to be polished by the polishing pad can be rendered high. Thereby, the polishing rate is improved, and high polishing surface planarity is also achieved. Therefore, the water-soluble particles are particularly preferably solid particles with which satisfactory indentation hardness can be secured in the polishing pad.

The sizes of the pores are preferably 0.1 to 500 µm, more preferably 0.5 to 100 µm. When the sizes of the pores are smaller than 0.1 µm, they are smaller than the particle diameters of abrasives in some cases, so that they become liable to hold the abrasives less sufficiently. Meanwhile, when the sizes of the pores are larger than 500 µm, satisfactory strength and indentation hardness are liable to become difficult to obtain.

In addition to the above water-insoluble matrix and water-soluble particles, the polishing pad of the present invention may also contain other compounding agents as required.

Illustrative examples of other compounding agents which can be incorporated into the polishing pad of the present invention include a compatibility-imparting agent, a filler, a surfactant, abrasives, a softener, an antioxidant, an ultraviolet absorber, an antistatic agent, a lubricant, and a plasticizer.

Illustrative examples of the above compatibility-imparting agent include water-soluble polymers having two or more groups selected from an acid anhydride group, a carboxyl group, a hydroxyl group, an epoxy group, an oxazoline group, an amino group and other groups in a molecule, and other coupling agents.

The above filler can be added to improve the rigidity of the polishing pad. Illustrative examples of the filler include calcium carbonate, magnesium carbonate, talc and clay.

Illustrative examples of the above surfactant include a cationic surfactant, an anionic surfactant, and a nonionic surfactant. Specific examples of the cationic surfactant include an aliphatic amine salt and an aliphatic ammonium salt. Specific examples of the anionic surfactant include aliphatic soap, carboxylates such as an alkyl ether carboxylate, sulfonates such as an alkyl benzene sulfonate, an alkyl naphthalene sulfonate and α-olefin sulfonate, sulfuric ester salts such as a higher alcohol sulfuric ester salt, an alkyl ether sulfate and a polyoxyethylene alkyl phenyl ether sulfate, and phosphoric ester salts such as an alkyl phosphoric ester salt. Specific examples of the nonionic surfactant include ether-type nonionic surfactants such as a polyoxyethylene alkyl ether, ether-ester-type nonionic surfactants such as a polyoxyethylene ether of glycerine ester, and ester-type nonionic surfactants such as a polyethylene glycol fatty acid ester, glycerine ester and sorbitan ester.

The polishing pad of the present invention can contain abrasives. In that case, chemical machinery polishing can be performed by supplying, for example, water, in place of a water-based dispersion for chemical machinery polishing. When the polishing pad of the present invention contains the abrasives, it is preferred that the pad contain, together with the abrasives, at least one selected from an oxidizing agent, an anti-scratching agent, a pH regulator and the like.

Illustrative examples of the above abrasives include particles of silica, alumina, ceria, zirconia and titania. These can be used alone or in combination of two or more.

Illustrative examples of the above oxidizing agent include hydrogen peroxide, peracetic acid, perbenzoic acid, organic peroxides such as t-butyl hydroperoxide, permanganic acid compounds such as potassium permanganate, bichromic acid compounds such as potassium bichromate, halogen acid compounds such as potassium iodate, nitric acid compounds such as nitric acid and iron nitrate, perhalogen acid compounds such as perchloric acid, persulfates such as ammonium persulfate, and heteropoly acids. Of these oxidizing agents, the persulfates such as ammonium persulfate are particularly preferred, in addition to the hydrogen peroxide and organic peroxides whose decomposition products are harmless.

Illustrative examples of the above anti-scratching agent include biphenol, bipyridyl, 2-vinylpyridine, 4-vinylpyridine, salicylaldoxime, o-phenylenediamine, m-phenylenediamine, catechol, o-aminophenol, thiourea, N-alkyl-group-containing (meth)acrylamide, N-aminoalkyl-groupcontaining (meth)acrylamide, 7-hydroxy-5-methyl-1,3,4-triazaindolizine, 5-methyl-1H-benzotriazol, phthalazine, melamine, and 3-amino-5,6-dimethyl-1,2,4-triazine.

The above pH regulator is a component other than the above other compounding agents and shows acidity or alkalinity upon contact with water. Illustrative examples of such a pH regulator include acids other than those described above, ammonia, and hydroxides of alkali metals. Specific examples of the hydroxides of alkali metals include sodium hydroxide, potassium hydroxide, rubidium hydroxide, and cesium hydroxide.

A method of preparing a composition for forming the polishing pad is not particularly limited. When the method comprises a kneading step, kneading can be performed by use of a known kneading machine. Illustrative examples of the kneading machine include a roll, a kneader, a Banbury mixer, and single-screw and multi-screw extruders. A kneaded composition for the polishing pad can be processed into a desired shape such as a sheet, a block or a film by carrying out press molding, extrusion, injection molding or the like. Further, by processing the composition having a desired shape to a desired size, the polishing pad can be obtained.

Further, the polishing pad can be obtained by kneading the water-soluble particles and an uncrosslinked polymer together by the above method, processing the obtained product to a desired shape, and crosslinking the molded article by the above method. The heating temperature for crosslinking may be room temperature to 300° C., preferably 50 to 200° C. Further, a composition containing the water-soluble particles and the uncrosslinked polymer can be molded in a mold and crosslinked. An article molded to a desired shape in advance can be crosslinked.

Further, a method of dispersing the water-soluble particles in the matrix material is not particularly limited. In general, however, the water-soluble particles can be dispersed by kneading the uncrosslinked polymer, the water-soluble particles and other additives in the manner described above. In this kneading, the uncrosslinked polymer is kneaded under heating so as to be processed easily, and the water-soluble particles are preferably solids at temperatures during the kneading. With the water-soluble particles in solid form, it is facilitated to disperse the water-soluble particles such that they show the above preferred average particle, regardless of the degree of compatibility thereof with the uncrosslinked polymer. Consequently, it is preferable to select the type of the water-soluble particles according to the processing temperature of the uncrosslinked polymer used.

The Shore D hardness of the polishing pad of the present invention is preferably 35 to 100, more preferably 50 to 90, much more preferably 60 to 85, as described above. When the Shore D hardness is lower than 35, pressure applicable to a surface to be polished at the time of polishing is liable to decrease, the polishing rate decreases, and polishing surface planarity may become insufficient.

On a surface, i.e., polishing surface of the polishing pad of the present invention, grooves and a dot pattern can be formed in a desired shape as required so as to improve dischageability of slurry. Further, on the rear surface (surface opposite to the polishing surface) of the polishing pad, a softer layer may be laminated so as to form a polishing pad having a multilayered structure. In addition, the shape of the polishing pad is not particularly limited. A shape such as a disk, a belt or a roller can be selected as appropriate according to a polishing device. Furthermore, it is also possible to form a through-hole in the polishing pad of the present invention and attach a window for end-point detection which has translucency.

The polishing pad of the present invention can be used in a polishing method of polishing the surfaces of various objects to be polished. According to the polishing method, chemical machinery polishing which is excellent in surface planarity can be carried out, and a high polishing rate can be attained.

The objects to be polished are not particularly limited, and various objects to be polished can be used. Illustrative examples of the objects to be polished include an object to be polished which involves a material to be embedded and an object to be polished which involves no material to be embedded.

An example of the object to be polished which involves a material to be embedded is a laminate obtained by depositing a desired material on the front surface of a board which is processed into a semiconductor device having grooves at least on the front surface, by a method such as CVD such that the desired material is embedded at least in the grooves. The above board generally comprises at least a wafer and an insulating film formed on a surface of the wafer. A stopper layer which serves as a stopper at the time of polishing may be formed on the surface of the insulating film. By polishing this object to be polished by use of the polishing pad of the present invention, the excessively deposited material to be embedded can removed, and the surface thereof can be flattened. When the object to be polished has the stopper layer under the embedded material, polishing of the stopper layer can also be carried out at the late stage of polishing of the embedded material.

The material to be embedded is not particularly limited. Illustrative examples thereof include (1) an $SiO_2$-based insulating material used in an STI step, such as P-TEOS, PE-TEOS, $O_3$-TEOS, HDP-SiO or FSG (fluoridated $SiO_2$-based insulating film), (2) a material for metal wiring which is used in a damasin step and comprises at least one of Al and Cu, (3) a material for via plugs which is used in a via plug formation step and comprises at least one of Al, Cu and W, (4) an interlayer insulating film material used in an interlayer insulating film formation step, as exemplified by an $SiO_2$-based insulating material such as P-TEOS, PE-TEOS, $O_3$-TEOS, HDP-SiO or FSG, BPSG (material prepared by incorporating B and/or P into $SiO_2$), Low-k (organic low-k insulating material), SOG, and HSQ-SOG (hydrogen-containing porous SOG). Further, a stopper material constituting the above stopper layer may be a nitride-based material such as $Si_3N_4$, TaN or TiN.

Meanwhile, illustrative examples of the object to be polished which involves no material to be embedded include polysilicon and bare silicon.

Further, an abrasive can be generally used in polishing the object to be polished. It is preferable that the abrasive be selected as appropriate according to the type of the object to be polished. For example, a water-based dispersion may be used as the abrasive. A material constituting the water-based dispersion is not particularly limited. Illustrative examples of the material include those mentioned above, such as water, abrasives, an oxidizing agent, a hydroxide of an alkali metal, acid, a pH regulator, a surfactant, and an anti-scratching agent. These can be used alone or in combination of two or more.

EXAMPLES

Hereinafter, the present invention will be further described with reference to Examples.

[1] Preparation of Composition for Polishing Pad and Molding of Polishing Pad

Example 1

80 vol % of 1,2-polybutadiene (product of JSR Corporation, trade name "JSR RB830") which was crosslinked later to become a matrix material and, as water-soluble particles, 20 vol % of β-cyclodextrin (product of BIO RESEARCH CORPORATION OF YOKOHAMA, trade name "DEXPAL β-100"; hereinafter, coupled β-cyclodextrin will be referred to as "modified β-cyclodextrin") with an average particle diameter of 16 μm which had been coupled with 1 wt % of γ-(2-aminoethyl)-aminopropyltrimethoxysilane in advance were mixed together in an extruder heated to 170° C. Thereafter, 0.3 parts by weight of organic peroxide (product of NOF CORPORATION, trade name "PERHEXIN 25B") was added, and the resulting mixture was further mixed at 130° C. and then crosslinked and molded in a mold at 170° C. for 20 minutes so as to obtain a polishing pad having a diameter of 60 cm and a thickness of 3 mm.

The obtained pad had a weight of about 1 kg and contained 280 g of modified β-cyclodextrin. This pad and 2 kg of deionized water were charged into a stainless steel container which was then placed in a thermostatic chamber adjusted to 25° C., and the contents were stirred by means of a magnetic stirrer. After 12 hours, the pad was taken out of the container, and 1.5 g of eluate was extracted into an aluminum plate and dried for 30 minutes by a dryer adjusted to 200° C. After drying, the weight of solid (modified β-cyclodextrin) remaining in the plate was 3.0 mg. From these numerical values, the elution ratio [(weight of modified β-cyclodextrin eluted by immersion/weight of modified β-cyclodextrin contained in polishing pad)×100] of β-cyclodextrin eluted into deionized water was calculated in the following manner. As a result, the elution ratio was about 1.4 wt %. Further, the elution ratio obtained when the above experiment was repeated except that a thermostatic chamber adjusted to 50° C. was used was about 1.5 wt %. Consequently, it is understood that a difference due to a difference in temperatures is very small.

Method of Calculating Elution Ratio: When a total elution amount is x (g) and the weight of solid remaining in the plate is y (3.0 mg), x/(2000+x)=(y/1000)/1.5 holds, and x is 4.008 g. Accordingly, the elution ratio is calculated as (4.008/280)×100=1.428 or about 1.4%.

The solubility of the coupled modified β-cyclodextrin in water was 2.3 wt % at 25° C. and 4.9 wt % at 50° C. The pH dependency of the solubility at 25° C. of the modified β-cyclodextrin is shown in FIG. 1. According to FIG. 1, solubilities at pHs of 3, 5, 7, 9 and 11 were 2.4 wt %, 2.5 wt %, 2.5 wt %, 2.7 wt % and 2.6 wt %, respectively. Further, solubilities at pHs of 3, 5, 9 and 11 were −4%, 0%, +8% and +4% based on solubility at a pH of 7, indicating that a change in solubility at a pH of 3 to 11 is very small. Adjustment of the pH was made by use of nitric acid or potassium hydroxide.

Then, on the polishing surface of the polishing pad, a plurality of circular grooves with an average of groove widths of 0.5 mm, an average of groove depths of 1 mm and an average of pitches of 1.75 mm were formed concentrically by use of an original groover of KATO KIKAI CO., LTD. Then, the polishing properties of the polishing pad were evaluated in the following manner.

(1) Polishing Rate and Presence/Absence of Scratches

The polishing pad was placed on the surface plate of a polishing device (product of SFT CO., LTD., model "LAP MASTER LM-15"), the revolution speed of the surface plate was set at 50 rpm, and an $SiO_2$ film wafer was polished for 2 minutes by using a slurry for chemical machinery polishing diluted to 3 times (product of JSR Corporation, trade name "CMS 1101") at a flow rate of 100 cc/min so as to evaluate a polishing rate and the presence or absence of scratches. The polishing rat was calculated by measuring the thickness of the film before and after polishing by use of an optical thicknessmeter and dividing a difference between the thicknesses by a polishing time. Further, the presence or absence of scratches was confirmed by observing the polished surface of the $SiO_2$ film wafer after polishing under an electron microscope. As a result, the polishing rate was 350 nm/min, and scratches were hardly observed.

(2) Evaluation of Dishing

After a semiconductor water (product of SKW CO., LTD., trade name "SKW-7") was polished under the following conditions, dishing was measured by use of a fine shape measuring device (product of KLA-Tencor Co., Ltd, model "P-10"). As a result, the dishing was 70 nm, and the polished surface had excellent surface planarity.

Slurry: CMS 1101 (product of JSR Corporation)
Chemical Machinery Polishing Device: EPO 112 (product of Ebara Corporation)
Slurry Feed Rate: 200 ml/min
Polishing Load: 400 g/cm$^2$
Revolution Speed of Surface Plate: 70 rpm
Revolution Speed of Head: 70 rpm
Polishing Rate: 400 nm/min
Polishing Time: 5.75 min (15% over polish)

Example 2

60 parts by volume of uncrosslinked 1,2-polybutadiene (product of JSR Corporation, trade name "JSR RB830"), 20 parts by volume of uncrosslinked ethylene-vinyl acetate copolymer (product of TOSOH CORPORATION, trade name "ULTRASEN 630"), and 20 parts by volume of β-cyclodextrin (product of BIO RESEARCH CORPORATION OF YOKOHAMA, trade name "DEXPAL β-100", average particle diameter: 20 μm) as water-soluble particles were mixed together by use of a twin-screw extruder adjusted to 160° C. There after, 1.0 parts by weight of organic peroxide (product of NOF CORPORATION, trade name "PERCUMYL D40") was added, and the resulting mixture was further mixed and then extruded into a mold. Then, the mixture was kept at 170° C. for 18 minutes so as to be crosslinked, thereby obtaining a polishing pad having a diameter of 60 cm and a thickness of 3 mm. Thereafter, on the polishing surface of the polishing pad, a plurality of circular grooves with an average of groove widths of 0.5 mm, an average of groove depths of 0.5 mm and an average of pitches of 4 mm were formed concentrically by use of an original groover of KATO KIKAI CO., LTD. Then, a polishing rate, the presence or absence of scratches and dishing were evaluated in the same manner as in Example 1. As a result, the polishing rate was 300 nm/min, scratches were hardly observed, the dishing was 60 nm, and the polished surface had excellent surface planarity.

Comparative Example 1

A polishing pad having a diameter of 60 cm and a thickness of 3 mm was obtained in the same manner as in Example 1 except that potassium sulfate having an average particle diameter of 20 µm (product of Takasugi Pharmaceutical Co., Ltd.) was used as water-soluble particles. Further, when the degree of elution to water of potassium sulfate was calculated in the same manner as in Example 1, it was 80 wt %. The elution rate when the same experiment was conducted in water at 50° C. was 82 wt %. The solubility of potassium hydroxide was 11 wt % at 25° C. and 12 wt % at 50° C. Further, on the polishing surface of the polishing pad, a plurality of circular grooves similar to those of Example 1 were formed concentrically by use of an original groover of KATO KIKAI CO., LTD. Then, a polishing rate, the presence or absence of scratches and dishing were evaluated in the same manner as in Example 1. As a result, the polishing rate was 300 nm/min and acceptable. However, a number of scratches were observed, the dishing was 180 nm, and the polished surface had poor surface planarity.

Comparative Example 2

On the polishing surface of a commercially available polishing pad (product of Rodel & Nitta Co., Ltd., trade name "IC1000") made of a polyurethane foam, a plurality of circular grooves similar to those of Example 1 were formed concentrically by use of an original groover of KATO KIKAI CO., LTD. Then, a polishing rate, the presence or absence of scratches and dishing were evaluated in the same manner as in Example 1. As a result, the polishing rate was 350 nm/min and acceptable. However, a number of scratches were observed, the dishing was 150 nm, and the polished surface had poor surface planarity.

As described above, in the polishing pad of the present invention, pores are formed in good conditions, the pores are not blocked by dressing, and slurry retainability is good, even when various slurries having different pHs are used within a wide pH range. Further, contained water-soluble particles neither absorb moisture nor swell, and the polishing pad can have a high degree of hardness, a high polishing rate, and good polishing properties such as surface planarity.

Further, if the solubility in water at 50° C. of the water-soluble particles and the elution ratio at 50° C. of the water-soluble particles when the polishing pad is immersed in water are within specific ranges, the polishing pad can have better polishing properties.

Further, if the solubility in water at 25° C. of the water-soluble particles at a pH of 3 to 11 is within a specific range, the polishing pad can have better polishing properties.

Further, when the water-insoluble matrix material contains a crosslinked 1,2-polybutadiene, an elasticity restoration property is imparted to the pad, the pores are not blocked, and the polishing pad can have better properties including surface planarity.

In the polishing pad of the present invention in which the water-soluble particles have an amino group, an epoxy group, an isocyanurate group or a hydroxyl group, pores are formed in good conditions, the pores are not blocked even by dressing, and slurry retainability is good. Further, the solubility of the water-soluble particles in water can be adjusted easily by a proper range, moisture absorption and swelling of the water-soluble particles in the pad can be suppressed, and the polishing pad can have a particularly high degree of hardness, a high polishing rate and good polishing properties such as surface planarity.

What is claimed is:

1. A polishing pad comprising:
    a water-insoluble matrix material comprising a crosslinked polymer, and
    water-soluble particles dispersed in the water-insoluble matrix material,
    wherein the solubility of the water-soluble particles in water is 0.1 to 10 wt % at 25° C., and the amount of water-soluble particles eluted from the pad when the pad is immersed in water is 0.05 to 50 wt % at 25° C.,
    wherein said water-soluble particles have an outer shell which has been formed on at least a portion of the outermost portion of the water-soluble particles by a coupling agent having at least one group selected from the group consisting of an amino group, an epoxy group and an isocyanate group.

2. The pad of claim 1, wherein the solubility of the water-soluble particles in water is 0.5 to 15 wt % at 50° C., and the amount of water-soluble particles eluted from the pad when the pad is immersed in water is 0.05 to 50 wt % at 50° C.

3. The pad of claim 1, wherein the solubility of the water-soluble particles in water is 0.1 to 3 wt % at 25° C. at a pH of 3 to 11.

4. The pad of claim 1, wherein the crosslinked polymer of the water-insoluble matrix material is a crosslinked 1,2-polybutadiene.

5. A polishing pad comprising:
    a water-insoluble matrix material comprising a crosslinked polymer, and
    water-soluble particles dispersed in the water-insoluble matrix material, wherein the solubility of the water-soluble particles in water is 0.1 to 10 wt % at 25° C. at a pH of 3 to 11, and solubility thereof in water at 25° C. at a pH of 3 to 11 is within ±50% of solubility thereof in water at 25° C. at a pH of 7,
    wherein said water-soluble particles have an outer shell which has been formed on at least a portion of the outermost portion of the water-soluble particles by a coupling agent having at least one group selected from the group consisting of an amino group, an epoxy group and an isocyanate group.

6. The pad of claim 5, wherein the solubility of the water-soluble particles in water is 0.1 to 3 wt% at 25° C. at a pH of 3 to 11, and solubility thereof in water at 25° C. at a pH of 3 to 11 is within ±50% of solubility thereof in water at 25° C. at a pH of 7.

7. The pad of claim 5, wherein the crosslinked polymer of the water-insoluble matrix material is a crosslinked 1,2-polybutadiene.

8. The pad of claim 1, wherein the coupling agent is at least one selected from the group consisting of an amino-group-containing silane-based coupling agent, an epoxy-group-containing silane-based coupling agent and an isocyanate-group-containing silane-based coupling agent.

9. The pad of claim 1, wherein the coupling agent is present in an amount of from 0.01 to 10 wt % based on the weight of the water-soluble particles.

10. The pad of claim 1, wherein the water-insoluble matrix material is a cross-linked 1,2-polybutadiene and the coupling agent of the water-soluble particles is γ-(2-aminoethyl)-aminopropyl trimethoxysilane.

11. The pad of claim 10, wherein the coupling agent is present in an amount of 1 wt %.

12. The pad of claim 1, wherein the water-soluble particles have an average particle diameter of 16 μm.

13. The pad of claim 10, wherein the water-soluble particles comprise β-cyclodextrin.

14. The pad of claim 1, wherein the coupling agent of the water-soluble particles is at least one selected from the group consisting of N-β-(aminoethyl)γ-aminopropyl trimethoxysilane, N-β(aminoethyl)γ-aminopropyl(methyl)dimethoxylsilane and N-β(aminoethyl)γ-aminopropyl triethoxysilane.

15. The pad of claim 1, wherein the coupling agent of the water-soluble particles is at least one selected from the group consisting of γ-glycidoxy propyltrimethoxysilane and γ-glycidoxy propyltriethoxysilane.

16. The pad of claim 1, wherein the coupling agent of the water-soluble particles is at least one selected from the group consisting of 1,3,5-tris(trimethoxysilylpropyl)isocyanurate and 1,3,5-tris(ethoxysilylpropyl)isocyanurate.

17. The pad of claim 1, wherein the coupling agent of the water-soluble particles has an amino group.

18. The pad of claim 1, wherein the coupling agent of the water-soluble particles has an epoxy group.

19. The pad of claim 1, wherein the coupling agent of the water-soluble particles has an isocyanurate group.

20. The pad of claim 5, wherein the coupling agent is at least one selected from the group consisting of an amino-group-containing silane-based coupling agent, an epoxy-group-containing silane-based coupling agent and an isocyanate-group-containing silane-based coupling agent.

21. The pad of claim 5, wherein the coupling agent is present in an amount of from 0.01 to 10 wt % based on the weight of the water-soluble particles.

22. The pad of claim 5, wherein the water-insoluble matrix material is a cross-linked 1,2-polybutadiene and the coupling agent of the water-soluble particles is γ-(2-aminoethyl)-aminopropyl trimethoxysilane.

23. The pad of claim 22, wherein the coupling agent is present in an amount of 1 wt %.

24. The pad of claim 5, wherein the water-soluble particles have an average particle diameter of 16 μm.

25. The pad of claim 22, wherein the water-soluble particles comprise β-cyclodextrin.

26. The pad of claim 5, wherein the coupling agent of the water-soluble particles is at least one selected from the group consisting of N-β-(aminoethyl)γ-aminopropyl trimethoxysilane, N-β(aminoethyl)γ-aminopropyl(methyl)dimethoxylsilane and N-β(aminoethyl)γ-aminopropyl triethoxysilane.

27. The pad of claim 5, wherein the coupling agent of the water-soluble particles is at least one selected from the group consisting of γ-glycidoxy propyltrimethoxysilane and γ-glycidoxy propyltriethoxysilane.

28. The pad of claim 5, wherein the coupling agent of the water-soluble particles is at least one selected from the group consisting of 1,3,5-tris(trimethoxysilylpropyl)isocyanurate and 1,3,5-tris(ethoxysilylpropyl)isocyanurate.

29. The pad of claim 5, wherein the coupling agent of the water-soluble particles has an amino group.

30. The pad of claim 5, wherein the coupling agent of the water-soluble particles has an epoxy group.

31. The pad of claim 5, wherein the coupling agent of the water-soluble particles has an isocyanurate group.

* * * * *